United States Patent
Blakeslee et al.

(10) Patent No.: US 7,275,358 B2
(45) Date of Patent: Oct. 2, 2007

(54) FLEXIBLE TRASH GUARD FOR SICKLE BAR MOWER

(75) Inventors: Edward A. Blakeslee, Ephrata, PA (US); Barry E. Smith, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/262,239

(22) Filed: Oct. 28, 2005

(65) Prior Publication Data

US 2007/0107407 A1    May 17, 2007

(51) Int. Cl.
*A01D 34/18* (2006.01)
(52) U.S. Cl. ............................. 56/298; 56/289; 56/296
(58) Field of Classification Search .................. 56/298
See application file for complete search history.

(56) References Cited

U.S. PATENT DOCUMENTS

| 291,563 | A | 8/1884 | Woodley |
| 371,963 | A | 10/1887 | Melcher |
| 1,252,608 | A | 1/1918 | Northaft |
| 2,433,704 | A | 12/1947 | Mills |
| 3,314,222 | A | 4/1967 | Scamoto et al. |
| 4,894,979 | A | 1/1990 | Lohrentz |
| 5,241,811 | A | 9/1993 | Bolinger |
| 5,340,042 | A | 8/1994 | Bergkamp et al. |
| 5,343,682 | A | 9/1994 | Puncochar |
| 5,845,470 | A | 12/1998 | Benway |
| 6,735,931 | B1 | 5/2004 | Blakeslee et al. |
| 6,834,486 | B2 | 12/2004 | Thompson et al. |

*Primary Examiner*—Thomas B. Will
*Assistant Examiner*—Mai T Nguyen
(74) *Attorney, Agent, or Firm*—John William Stader; Michael G. Harms

(57) ABSTRACT

A flexible trash guard for a sickle bar mowing apparatus that sits between the hold-down and the stud plate, thus eliminating the "hair pinning" of crop matter in the opening of the hold-down clip where the stud passes through the opening.

8 Claims, 3 Drawing Sheets

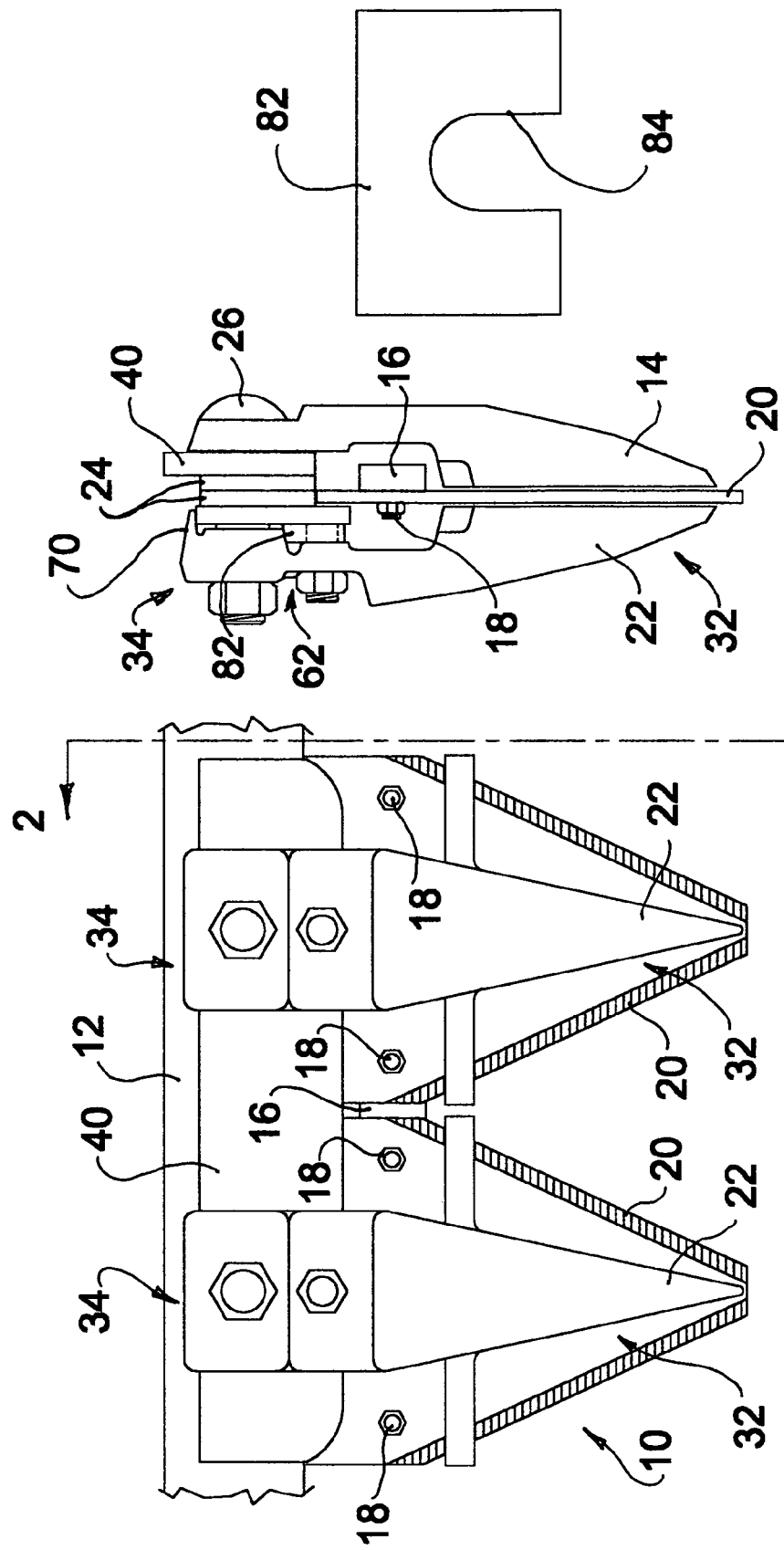

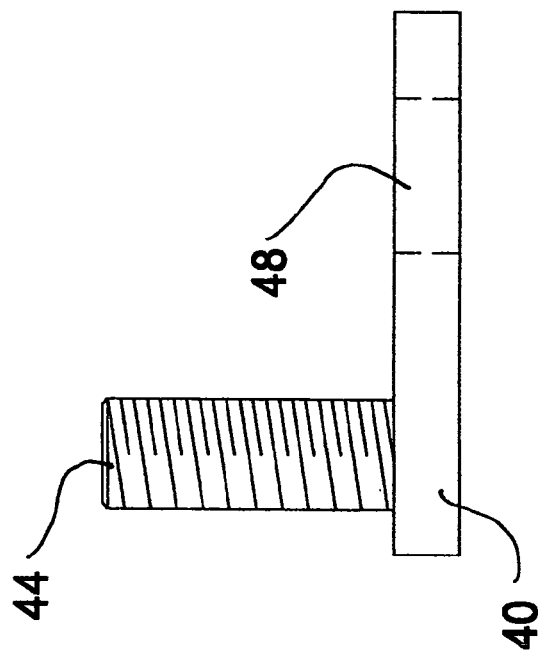
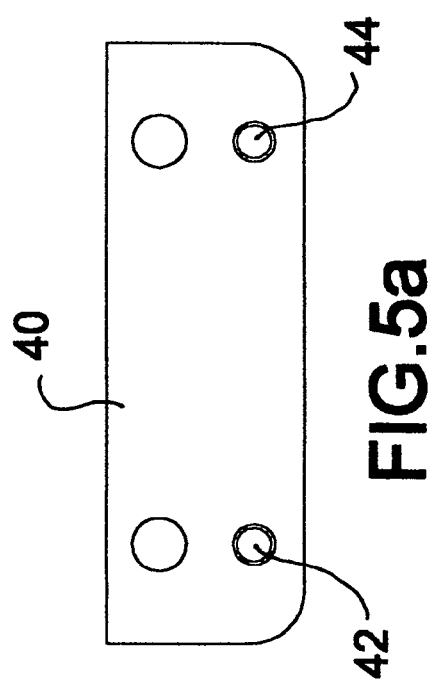
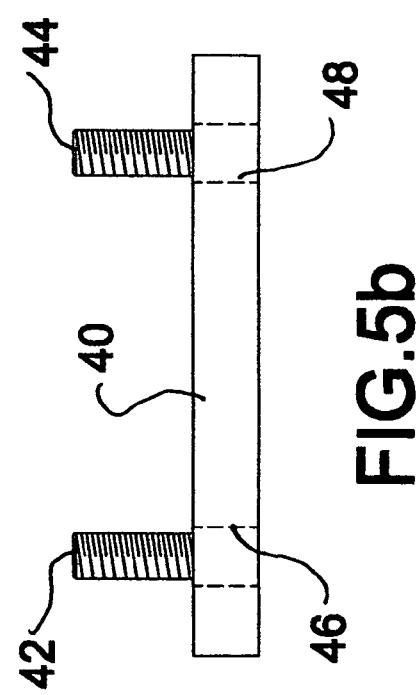

FLEXIBLE TRASH GUARD FOR SICKLE BAR MOWER

BACKGROUND OF THE INVENTION

The present invention relates to an agricultural mowing apparatus of the reciprocating sickle type and, more particularly, to a trash guard for a sickle-type cutterbar.

The general mode of operation of reciprocating sickle bar mowing apparatus is well known, as is the importance of keeping the cutting components clean and clear of crop buildup. Field operation of the cutting mechanism disclosed in U.S. Pat. No. 6,735,931 (incorporated herein by reference in its entirety) identified a problem whereby crop material was "hair pinning" in the opening of the hold-down where the stud from the stud plate passed through the opening. Such buildup puts the components under undue stress and contributes to untimely misadjustment of the various component relationships. Maintaining component relationships is of significant importance, because, too much clearance allows additional crop material accumulation to force the knife section away from the cutting edges of the guards, greatly reducing cutting efficiency. Too small a clearance results in drag on the sickle bar assembly and a resultant increase in wear rate and power requirements.

The cutting mechanism disclosed in the '931 patent is quite an improvement over the prior art in that it permits easy and accurate adjustment of the various component relationships. However, the buildup mentioned above reduced the value of the ease and accuracy of adjustment by reducing the time that the adjustments were maintained.

It would be advantageous to reduce or eliminate the buildup of crop material and associated difficulties identified above.

SUMMARY OF THE INVENTION

Accordingly, it is an object of the present invention to provide an improved trash guard for a sickle bar mowing apparatus.

It is another object of the present invention to provide a flexible trash guard to resolve a field problem of "hair pinning" in the opening of a hold-down clip where the stud from the stud plate passes through the opening.

It is a further object of the present invention to provide a flexible trash guard for a sickle bar mowing apparatus that will fill the space between the hold-down and the stud plate.

It is a further object of the present invention to provide a flexible trash guard for a sickle bar mowing apparatus that can be compressed between the stud plate and the hold-down clip at the initial installation of the various components.

It is a still further object of the present invention to provide a flexible trash guard that permits additional compression when the hold-down clip gap is adjusted using the adjustment nut.

It an even still further objected of the present invention to provide a flexible trash guard that is durable in construction, inexpensive of manufacture, carefree of maintenance, facile in assemblage, and simple and effective in use.

These and other objects are achieved by providing a flexible trash guard for a sickle bar mowing apparatus that sits between the hold-down and the stud plate, thus eliminating the "hair pinning" of crop matter in the opening of the hold-down clip where the stud passes through the opening.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a top plan view of a fragmentary part of a cutterbar assembly showing a complete assembly of the stud plate for a sickle bar hold-down;

FIG. 2 is a vertical left section taken along line 2-2 of FIG. 1;

FIG. 3 is a top plan view of the flexible trash guard;

FIG. 5a is a top plan view of the stud plate element;

FIG. 5b is a front elevation view of the stud plate of FIG. 5a; and

FIG. 5c is an end, or side elevation view of the stud plate of FIGS. 5a and 5b.

DESCRIPTION OF THE PREFERRED EMBODIMENT

Figure 4:
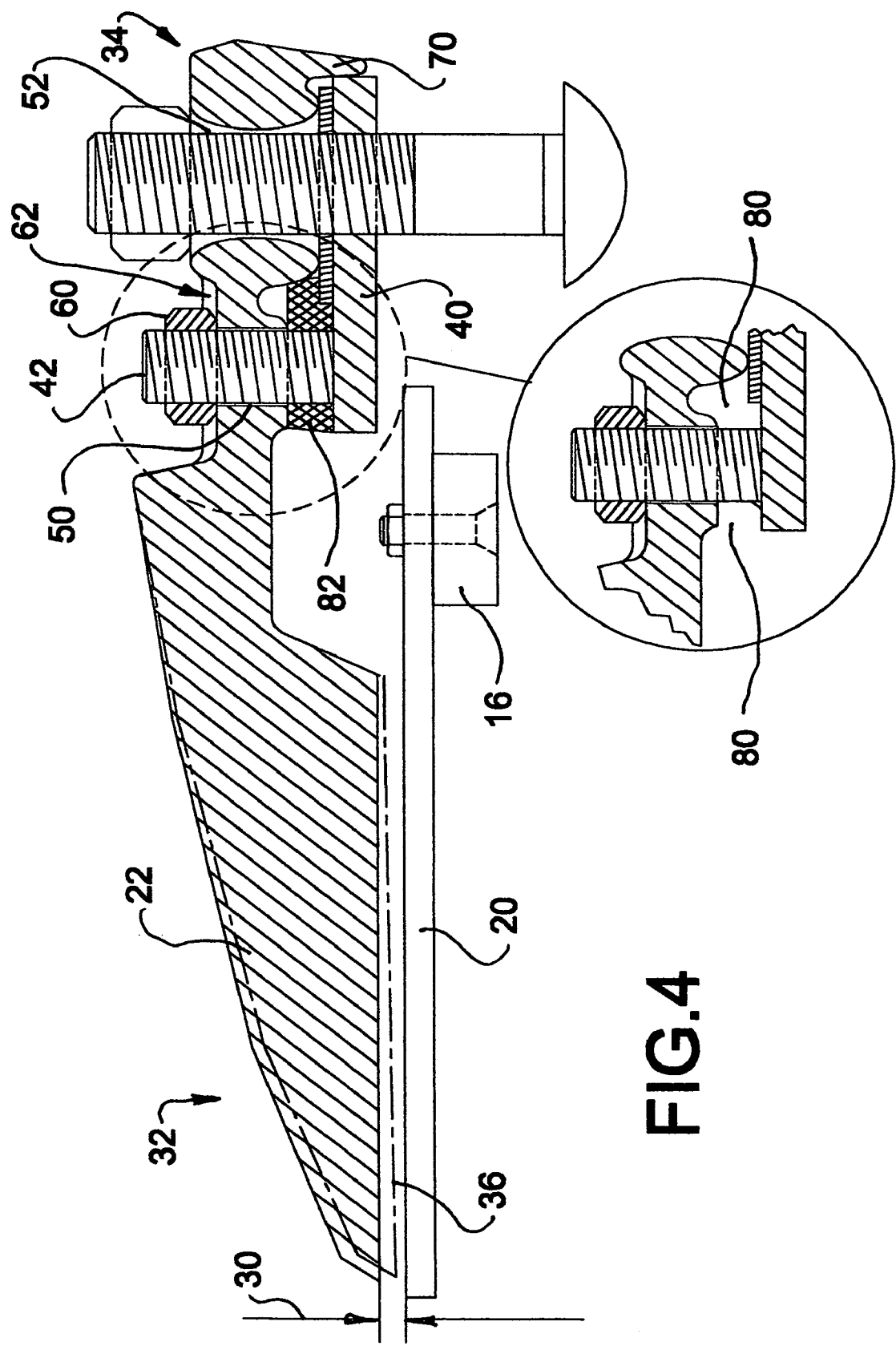
FIG. 4 is a top plan view of one hold-down forging, showing the trash guard removed in a detail.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

The harvester or other machine with which the present invention is utilized has a crop cutting mechanism, most commonly referred to as a reciprocating sickle-type cutterbar 10 that normally extends horizontally across the path of forward travel of the harvester. The cutterbar 10 is typically affixed to the forward lower portion of a frame structure or a fairly rigid metallic floor member 12 so as to present the cutterbar at the initial crop-engaging portion of the machine—as shown in more detail in U.S. Pat. No. 6,735,931. A plurality of sickle guards 14, depicted best in FIG. 2, are positioned regularly across the bottom of cutterbar 10. An elongate knife-back 16 also extends across the cutterbar and has removably affixed thereto by bolts 18, a plurality of knife sections 20. The knife sections 20 are reciprocated lengthwise (by means, not shown, at one or both ends, depending upon whether it is a single or double sickle bar cutterhead) so that the cutting edges on the knives register with the generally matching edges of the guards 14 to create a scissoring action to sever the crop material. In order to ensure that the knife sections and guards maintain the proper relationship for cutting, a plurality, one above each sickle guard, of hold-downs 22 are attached. This "sandwich" of components, along with appropriate shims 24 (shown in FIG. 2), is held together and attached to the member 12 by fastener means in the nature of carriage bolts 26.

In all such mechanisms, the relationship between the hold-down and the knife section is critical to efficient and effective operation, and the objective in performing such adjustment is to minimize the gap 30, as seen in FIG. 4, yet allow adequate space for the free movement of the knife sections. The hold-down is intended to promote easy and effective adjustment of this relationship.

Referring broadly to FIGS. 1, 2 and 4, the hold-down 22 is an elongate forging with a forward (in relation to the direction of travel of the harvester) finger-like portion 32 and a rear generally rectangular box-like portion 34. Referring to FIG. 4, the overall objective is to adjust the position of the lower surface 36 of front portion 32 of hold-down 22 between the fixed-line location and the dotted-line location, i.e., adjust the size of gap 30.

As shown in FIGS. 5a-5c, generally rectangular stud plate 40, comprising a flat portion of suitably rigid material such as, for example, 10B-38 steel, hardened, and two spaced-apart stainless steel studs 42, 44 (also hardened) stud-welded thereto and two holes 46, 48 therethrough and adjacent to the studs. The stud plate is compressed by carriage bolt 26 into the "sandwich" of components making up the cutterbar 10. The material characteristics, particularly of the flat portion, are important because of the wear to which the components are subjected. In this case, the knife sections 20 reciprocate closely adjacent the bottom of the stud plate 40, subjecting the two components to significant abrasion due to materials such as dirt and crop that move between the two. The preferred stainless steel studs do not corrode or "stick" to the nuts, and thus promote ease of adjustment.

The stud plate 40 mounts two hold-downs to the cutterbar structure 10 as shown generally in FIG. 1. Two is a convenient number of hold-downs making up this grouping, though any reasonable number could be used. Two provides what has been found to be the most expedient number for assembly and repair operations. Sometimes, however, because of the length of the cutterbar or for other reasons, single hold-downs may be used on part of the cutterhead assembly. Each hold-down 22 has a pair of holes 50, 52 vertically therethrough similar in size and spacing to the studs and holes 42, 46 and 44, 48 of stud plate 40 so that, as shown in FIG. 4, the holes 50 fit over studs 44 and the two holes 48, 52 are in alignment for the insertion of carriage bolts 26. The lower area of the rear portion 34 of each hold-down 22 has a horizontal slot-like variably formed area raised relative to the lower surface 36 of the forward portion of hold-down 22 into which the stud plate 40 is fitted. The opposing upper surface, opposite the area into which the stud plate is fitted, is lowered and variably formed to receive a nut 60 on stud 42.

As best seen in FIGS. 2 and 4, rear portion 34 of hold-down 22 includes a narrowed section 62. Narrowed section 62 is of such size and thickness as to permit a small amount of flexing of the forward portion 32 of the hold-down, in spite of the fact that the hold-down 22 is preferably a forging. With the cutterbar assembled as in FIG. 2, tightening of the nut 60 on stud 42 will cause flexure at section 62 and resultant pivoting of the forward portion 32 of hold-down 22 about that section, moving the lower surface 36 toward knife section 20.

The rearmost segment of the rear portion 34 of hold-down 22 includes a protruding ridge, or lip 70 extending across the rear end thereof. Lip 70 is generally perpendicular to the longitudinal axis of hold-down 22, i.e., the axis running from the point of finger-like front portion 32 through the middle of rectangular rear portion 34. Thus, in the assembled "sandwich", when lip 70 is in registry with the rear edge of stud plate 40, the front portion 32 of hold-down 22 is in proper position over the knife section 18. Lip 70 also prevents the "wiggling" of front portion 32 of hold-down 22, even if the hardware somehow becomes slightly loosened.

It was discovered in field operations that crop material would gather in the opening 80 (FIG. 4 detail) of hold-down 22 where the stud 42 from stud plate 40 passes through the opening, "hair pinning" around the stud and other components. To eliminate this problem, a flexible rubber trash guard 82 was fashioned to fit into and fill the opening when the "sandwich" is being constructed. With this opening filled, crop material is not provided the opportunity to accumulate. Either a hole the general diameter of the stud or a slot, such as 84, is necessary to fit the trash guard into position, i.e., as shown in FIG. 3, with the slot 84 open toward the rear end of the assembled cutterhead, stud 42 would be surrounded generally on three sides by trash guard 82. If the trash guard is slightly compressed during assembly, it will better hold its position. While the term "rubber" is used to describe trash guard 82, any reasonably flexible, durable and compressible non-metallic material may be used such as polyethylene or plastics with the necessary physical characteristics.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

What is claimed is:

1. In a cutting apparatus of the reciprocating sickle type adapted for cutting standing crops and having an elongate frame member generally transverse to the direction of travel of the cutting apparatus, a plurality of sickle guards having finger portions extending forwardly from said frame member and cutting edges; said guards rigidly affixed to said frame member, and an elongated reciprocating sickle bar assembly including a plurality of knife sections with angled forward converging cutting edges and upper and lower surfaces, each said cutting edge intersecting with a cutting edge on the adjacent section at a rearward vertex and registering with said cutting edges of said guards as the sickle bar assembly reciprocates, a plurality of hold-downs, each said hold-down comprised of an elongate body having a forward finger portion extending outwardly over said upper surfaces of said knife sections and an opposing rectangular rear portion, said rear portion having a first vertical hole therethrough adjacent the rear end thereof and a second vertical hole therethrough between said first hold and said forward finger portion, said rear portion further having a reduced cross-sectional area between said first and second holes, a plurality of stud plates each comprising an elongate generally rectangular plate having two holes therethrough and two elongate threaded studs welded thereto and projecting away therefrom, said studs and holes spaced and aligned such that they align with said first and second holes through said hold-downs, with the studs projecting through said second holes, said hold-downs affixed to said plurality of stud plates and rigidly affixed to said frame member by bolts extending through said first holes and said studs each having a nut thereon to tighten on said hold-downs to adjust the spatial relationship between the individual hold-downs and said upper surfaces of said knife sections, the improvement comprising:

a generally stiff, compressible non-metallic trash guard located between each said said plate and respective said hold-down generally around respective said stud, generally filling any gap between said stud plate and said hold down.

2. The improvement of claim 1, wherein:

said trash guard is made of rubber.

3. The improvement of claim 1, wherein:

said trash guard is made of a synthetic rubber-like material.

4. The improvement of claim 3, wherein:

said trash guard is generally rectangular in plane view and is formed with a slot therein extending from one edge toward the opposing edge, the width of said slot being generally equal to the diameter of said stud.

5. A cutting apparatus of die reciprocating sickle type adapted for cutting standing crops, comprising:

a sickle bar assembly:

a plurality of hold-downs affixed to the sickle bar assembly with a gap between each hold-down and the sickle bar assembly;

each hold-down having an associated stud plate with a threaded stud affixed thereto by a nut that flexes the hold-down, thereby adjusting the gap between the hold-down and the sickle bar assembly; and a generally stiff, compressible non-metallic trash guard located between the stud plate and the hold-down generally around the stud, generally filling any gap between the stud plate and the hold-down; wherein the trash guard does not affect the gap between the hold-down and sickle bar.

6. The improvement of claim 5, wherein:

said trash guard is made of rubber.

7. The improvement of claim 5, wherein:

said trash guard is made of a synthetic rubber-like material.

8. The improvement of claim 7, wherein:

said crash guard is generally rectangular in plane view and is formed with a slot therein extending from one edge toward the opposing edge, the width of said slot being generally equal to the diameter of said stud.

\* \* \* \* \*